(No Model.)
J. O. SCHUBERT.
PROCESS OF TESTING OILS.
No. 270,489. Patented Jan. 9, 1883.
WITNESSES:
W. W. Hollingsworth
W. X. Stevens.
INVENTOR:
J. O. Schubert
BY
ATTORNEYS.

UNITED STATES PATENT OFFICE.

JULIUS OTTO SCHUBERT, OF PARKERSBURG, WEST VIRGINIA.

PROCESS OF TESTING OILS.

SPECIFICATION forming part of Letters Patent No. 270,489, dated January 9, 1883.

Application filed October 9, 1882. (No model.)

*To all whom it may concern:*

Be it known that I, JULIUS OTTO SCHUBERT, a citizen of the United States, residing at Parkersburg, in the county of Wood and State of West Virginia, have invented a new and useful Improvement in Processes of and Devices for Testing Oils, of which the following is a full, clear, and exact description, which will enable others skilled in the art to make and use the same.

My invention relates to that class of processes for testing oil which operate upon crude petroleum by first securing a sample by taking a vertical column from the mass to be tested, then allowing the same to clarify by settling the water and sediment to the bottom, and finally testing the sample in a graduated glass to ascertain the per centum of pure oil, of water, and of sediment therein.

Heretofore there has been difficulty experienced, first, in securing a fair sample of the oil contained in any receptacle, on account of the great variation in the purity of the oil of different strata therein; second, in settling the sample to a fair condition to be tested for gravity; and, third, in procuring a device which would show at a glance the per centum of pure oil, of water, and of sediment in the sample.

The object of this invention is to obviate the last two difficulties, which I do by means of the process and device hereinafter fully described and set forth, reference being had to the accompanying drawing, which is an elevation of the device.

In my process of testing oils the first step is to secure a fair sample of the mass of oil, which I do by inserting a "thief" vertically into the oil to a point as near the bottom as shall be previously decided upon, when the thief closes upon the oil contained and the sample is withdrawn. This sample is poured into a large receptacle and very thoroughly agitated, that it may become uniform by having its impurities equally distributed throughout its mass. I then take a quantity of this mass and mix with it an equal quantity—more or less would not change the result, except in degree or convenience of operation—of some of the lighter products of distillation of oil—say benzine having a gravity of 70° Baumé, containing no water—thus producing a mixture so light that water and sediment will rapidly settle from it. When this settling is completed the sample is ready for the test, which may be made in any usual manner; but I have devised an implement for this purpose, operating on a principle which is alone adapted to carry out my process in full of testing oils quantitively. This device consists of a glass tube twenty-two inches long, (more or less,) open at the top and closed at the bottom. A portion of this tube—say twenty inches for decimal convenience—is graduated and marked as follows: The top or twenty-inch graduation is marked 200, the middle or ten-inch graduation is marked 100, and the inches below that are marked 90, 80, 70, &c., down to 10. The second and third inches are divided into tenths, also the first inch; but the tenths of the first half-inch being subdivided into quarters and the second half-inch into halves. These tenths are units in the column of one 100. To use this graduated glass in testing oil by my process, enough of the sample to fill the glass to 100 is mixed with an equal quantity of benzine described, and after agitating to thoroughly mix the two the mixed mass is placed in the graduated glass, filling it to 200, and it may then be allowed to stand and settle, which it will do rapidly in comparison with the old process; but to precipitate the water and sediment to the bottom still more quickly I place the graduated glass containing the sample in a water bath at 120° Fahrenheit for two hours. Then I remove it from the bath and allow it to settle until cold, when the per centum of impurity may be easily read upon the graduated scale of the glass, and herein consists the connection which makes my graduated glass a necessity to my process.

It will be seen by observing the glass that the water and sediment, having separated from the mixture of benzine and oil, occupy the lower part of the glass, and that, being graduated to 100, whatever observations are made as to the depth of sediment and water are at once read in figures indicating the per centum of sediment and water in the oil so tested. Thus it will be seen that the whole operation of testing the oil by my process may be conducted more accurately and satisfactorily in from three to four hours than it was formerly done in thirty days.

What I claim as my invention is—

1. In testing oils by settling the same and noting the proportion of water and sediment contained therein, the process which consists in first mixing with the sample of oil to be tested an equal quantity of some one of the lighter products of distillation of oil, then allowing the same to settle in a graduated glass, and comparing the amount of water and sediment shown at the bottom of the oil with the quantity of oil, without regard to the quantity of the lighter product of distillation mixed with it, substantially as specified.

2. In testing crude petroleum, the process which consists in first thoroughly mixing with the sample to be tested an equal quantity of benzine, then allowing the same to settle in a graduated glass, and comparing the amount of sediment and water shown with the amount of oil containing it, without regard to the quantity of benzine mixed with it, as specified.

3. In testing crude petroleum, the process which consists in first thoroughly mixing with the sample to be tested a suitable quantity of benzine in a graduated glass, then precipitating the water and sediment therefrom by placing the glass and contents in a water bath of about 120° Fahrenheit for about two hours, then allowing the same to cool, and comparing the amount of sediment and water shown with the amount of oil containing it, without regard to the quantity of benzine mixed with it, as specified.

4. In testing heavy oils, the process which consists in first filling a graduated glass up to the mark 100 with the sample of oil to be tested, then adding thereto some one of the lighter products of distillation of oil—as benzine, for example—until the glass is filled up to mark 200, then thoroughly mixing the two liquids by agitation, then warming the glass containing the liquids so mixed in a water bath at a temperature of about 120° Fahrenheit for about two hours, then removing it from the bath and allowing it to become cold, and finally completing the test by reading on the first one hundred graduations of the glass the per centum of water and precipitate shown by the height of the same in the bottom thereof.

5. In testing heavy oils, the process which consists in precipitating the water and sediment from a sample thereof by first raising its specific gravity by mixing therewith a quantity of the lighter products of distillation of oil, then heating the same in a glass tube to a temperature of about 120° Fahrenheit for about two hours, then permitting it to become cold, and completing the test by comparing the amount of sediment and water settled to the bottom with the whole amount of oil tested, without regard to the lighter product mixed with it, as specified.

JULIUS OTTO SCHUBERT.

Witnesses:
W. L. COLE,
W. N. MILLER.